(12) United States Patent
Elnathan et al.

(10) Patent No.: US 6,820,170 B1
(45) Date of Patent: Nov. 16, 2004

(54) CONTEXT BASED CACHE INDEXING

(75) Inventors: Nathan Y. Elnathan, Raanana (IL); Alexander Joffe, Palo Alto, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 185 days.

(21) Appl. No.: 10/179,995

(22) Filed: Jun. 24, 2002

(51) Int. Cl.[7] .............................................. G06F 12/00
(52) U.S. Cl. ......................... 711/108; 711/100; 711/118
(58) Field of Search ............................ 711/3, 100, 108, 711/118, 119, 154, 206, 207

(56) References Cited

U.S. PATENT DOCUMENTS

| | | | | |
|---|---|---|---|---|
| 5,283,882 A | * | 2/1994 | Smith et al. ................... | 365/49 |
| 5,428,565 A | * | 6/1995 | Shaw ........................... | 365/49 |
| 5,550,995 A | * | 8/1996 | Barrera et al. ................. | 711/3 |
| 5,574,875 A | * | 11/1996 | Stansfield et al. ............. | 711/3 |
| 5,581,722 A | * | 12/1996 | Welland ....................... | 711/207 |
| 5,860,095 A | * | 1/1999 | Iacobovici et al. .......... | 711/119 |
| 5,901,147 A | | 5/1999 | Joffe et al. ................... | 370/412 |
| 6,014,732 A | * | 1/2000 | Naffziger .................... | 711/203 |
| 6,128,278 A | | 10/2000 | Joffe et al. .................. | 370/229 |
| 6,215,685 B1 | * | 4/2001 | Fung et al. ................... | 365/49 |
| 6,307,860 B1 | | 10/2001 | Joffe et al. .................. | 370/412 |
| 6,330,584 B1 | | 12/2001 | Joffe et al. .................. | 718/107 |
| 6,366,978 B1 | * | 4/2002 | Middleton et al. .......... | 711/108 |
| 6,378,042 B1 | | 4/2002 | Henderson et al. ......... | 711/128 |
| 6,564,301 B1 | * | 5/2003 | Middleton .................... | 711/144 |
| 6,625,714 B1 | * | 9/2003 | Lyon ........................... | 711/207 |

FOREIGN PATENT DOCUMENTS

WO     WO 95/20282     7/1995

OTHER PUBLICATIONS

Dongwook Kim et al., "A Virtual Cache Architecture for Retaining the Process Working Sets in a Multiprogramming Environment", IEICE Trans. Infsyst., vol. E79–D, No. 12 Dec. 1996.

\* cited by examiner

*Primary Examiner*—Tuan V. Thai
(74) *Attorney, Agent, or Firm*—Silicon Valley Patent Group LLP

(57) ABSTRACT

Multiple attempts are made to identify an entry in a cache. For example, a first attempt uses a RAM-based addressing structure (such as the above-described table) and a second attempt (on failure of the first attempt) uses a CAM-based addressing structure. The RAM-based addressing structure is faster than the CAM based-addressing structure, and in cases of a hit on the first attempt, cache performance is based on RAM cycle time rather than CAM cycle time. On the other hand, a miss on the first attempt does not mean that the data is not present in the cache. Instead, a second attempt using the CAM in the traditional manner finds the data if present in the cache.

14 Claims, 15 Drawing Sheets

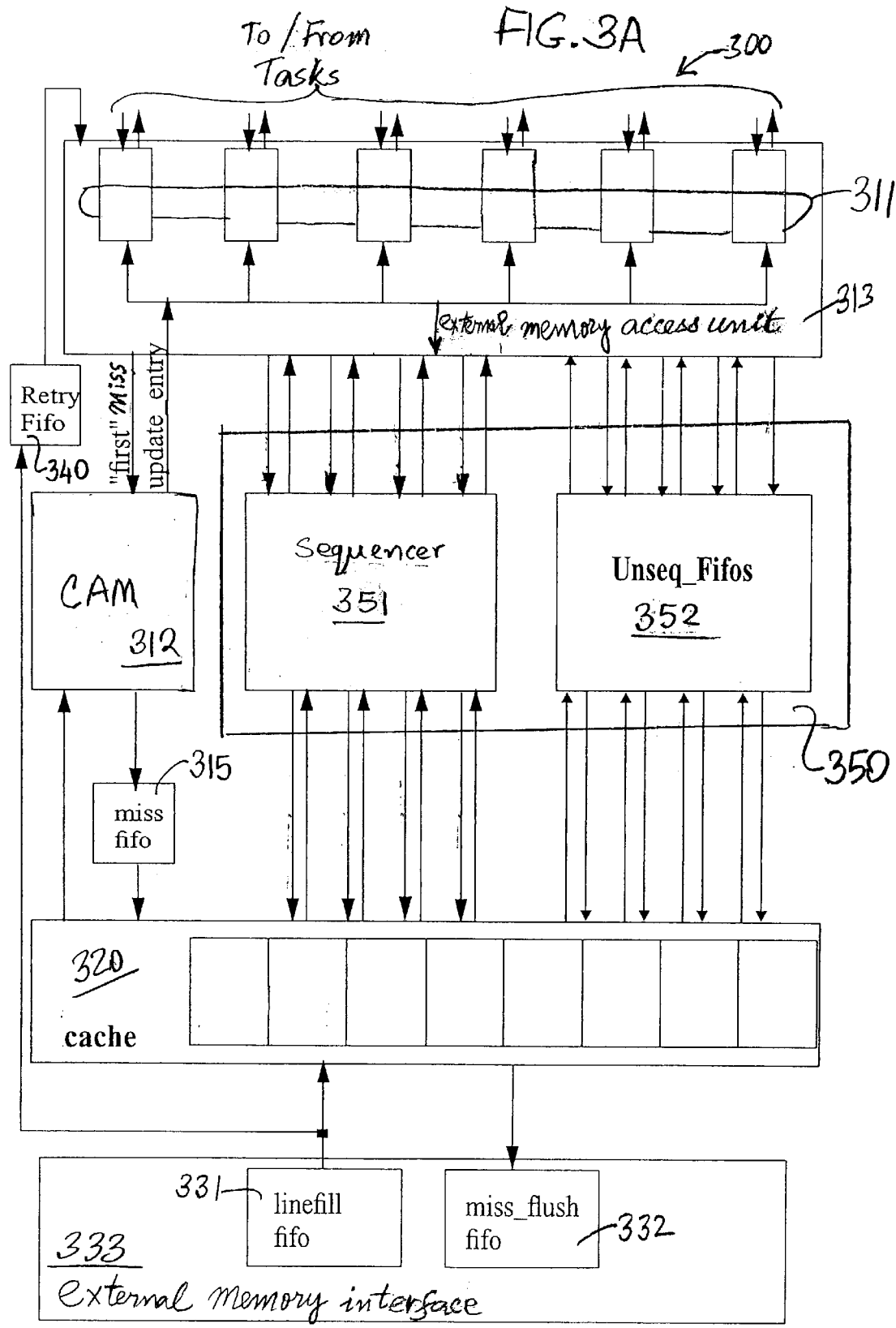

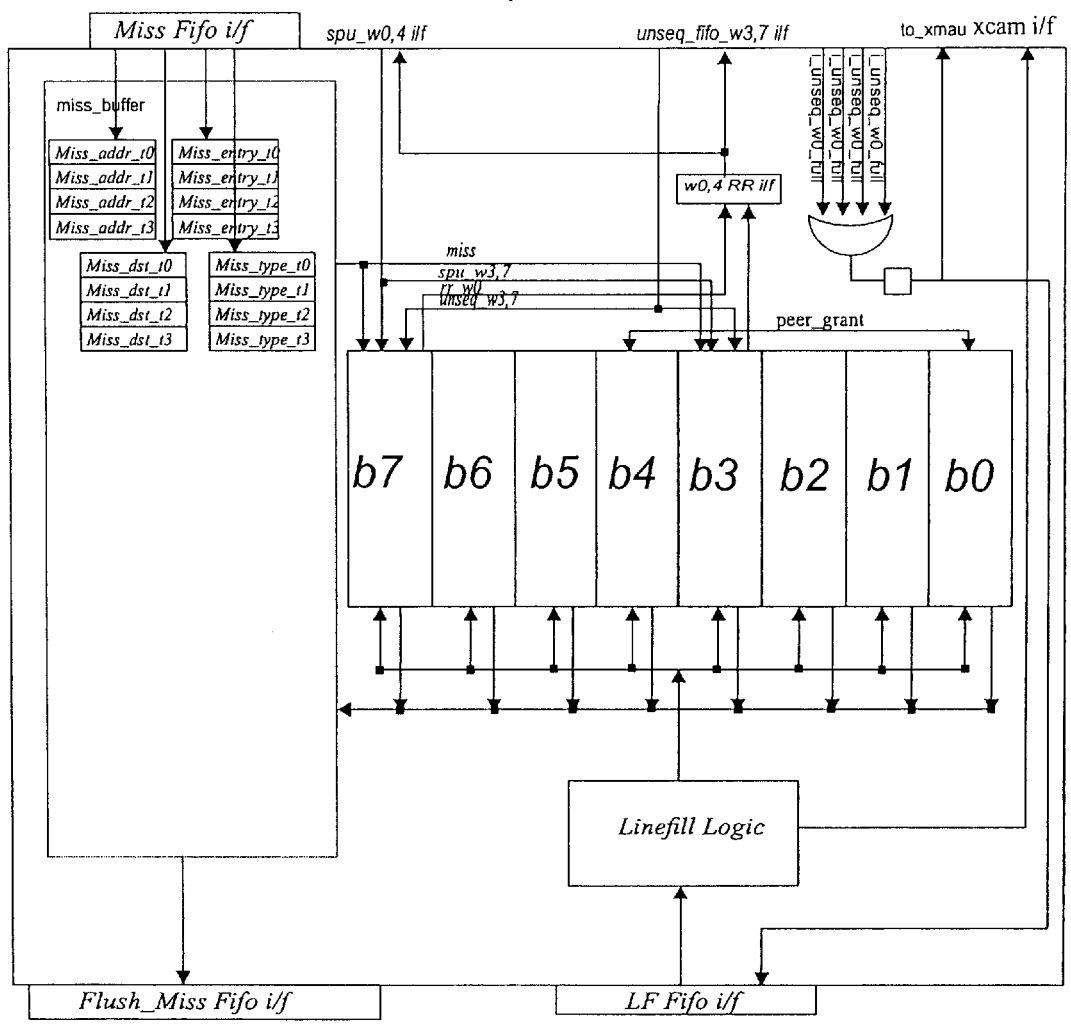

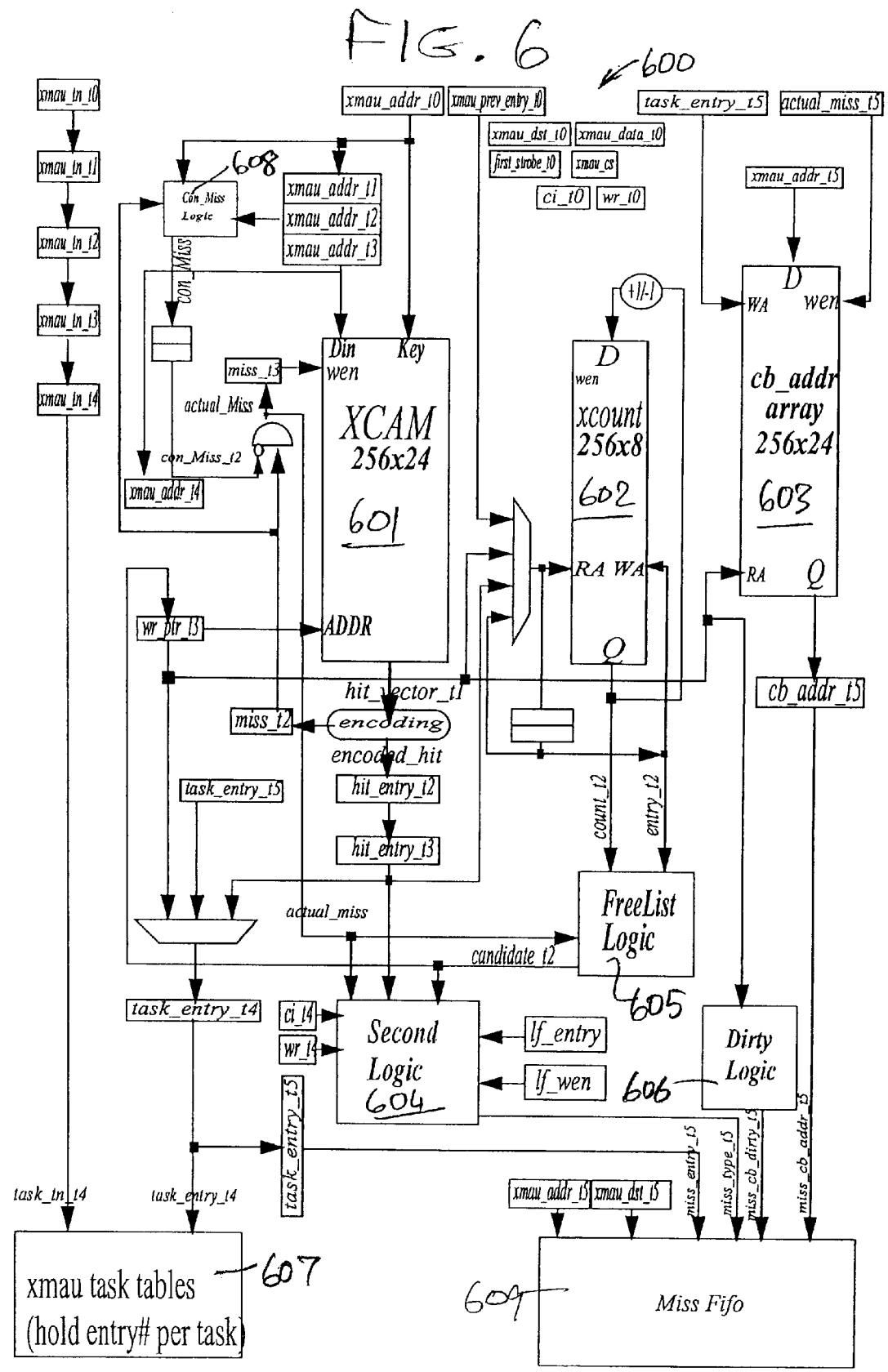

CONTEXT BASED CACHE INDEXING

BACKGROUND OF THE INVENTION

The present invention relates to data processing, and more particularly to accessing from a cache, data related to networks.

It may be desirable to process data when data are transferred in networks. For example, a router may replace physical addresses (MAC-layer addresses) in a data packet before transmission. An ATM switch may replace cell headers. Further, a router, a bridge, or some other device that transfers data between networks may perform protocol related transformations if the network on which the data are received and the network on which the data are transmitted use different protocols. See, for example, PCT publication WO 95/20282 (27 Jul. 1995) incorporated herein by reference.

Such data processing can place a heavy burden on a memory that holds the data. To provide fast access to data held in memory, certain data that is frequently accessed may be temporarily stored in and retrieved from a cache. To allow any data to be stored at any location in a cache, many caches use content addressable memories (CAMs). A CAM is a well-known device that permits contents of the memory to be searched and matched instead of having to specify a memory location address in order to retrieve data from the memory.

Such a CAM can be used to accelerate any application requiring fast searching of a database, list, or pattern, such as in database machines, image or voice recognition, or computer and communication networks. CAMs are often used to store a routing table for high speed switching systems. These systems need to rapidly search the routing table to look for a matching destination address so that a data packet may be routed to the appropriate destination address.

A CAM is normally significantly slower than a random access memory (RAM). However, RAMs are not normally used to implement caches for holding network-related data because such caches would be sparsely populated, thereby resulting in a significant cost.

There is therefore a need for a fast cache to hold network-related data, but without significant cost.

Incorporated by reference herein in their entirety are the following references:

U.S. Pat. No. 6,307,860 granted to Joffe, et al. on Oct. 23, 2001, and entitled "Systems and methods for data transformation and transfer in networks";

U.S. Pat. No. 6,330,584 granted to Joffe, et al. on Dec. 11, 2001, and entitled "Systems and methods for multi-tasking, resource sharing and execution of computer instructions";

U.S. Pat. No. 5,901,147 granted to Joffe on May 4, 1999, and entitled "Apparatus and methods to change thresholds to control congestion in ATM switches";

U.S. Pat. No. 6,128,278 granted to Joffe, et al. on Oct. 3, 2000 and entitled "Cell queuing in ATM switches";

U.S. Pat. No. 6,366,978 granted to Middleton, et al. on Apr. 2, 2002, and entitled "Cache memory";

U.S. Pat. No. 6,378,042 granted to Henderson, et al. on Apr. 23, 2002, and entitled "Caching associative memory";

An article entitled "A Virtual Cache Architecture for Retaining the Process Working Sets in a Multiprogramming Environment", IEICE TRANS. INFSYST., VOL. E79-D, NO. 12 DEC. 1996 by Dongwook KIM et al.

SUMMARY

In some embodiments of the invention, a content addressable memory (CAM) is used in the normal manner to address a cache, but a table is used prior to use of the CAM. In several embodiments, the table is indexed using an identity of a task (in a multitasking system), rather than a portion of an address of the data being sought. Use of a task's identity ensures that the size of the table is related to (e.g. equal to) the maximum number of tasks, which eliminates the conventional problem of size in using direct mapped caches.

A value supplied by the table (based on the task's identity) is compared to an address of the data being sought. If the address matches the value from the table, there is a hit, and data is immediately fetched from the cache. If there is a miss in the table, then the CAM is used, to check if the data is present in the cache. If there is a hit in the CAM, the data is fetched from the cache. In case of a miss in the CAM, the data is not present in the cache, and the data must be fetched from another device (such as a second level cache or memory), and placed in the cache.

Use of two addressing structures, namely the above-described table and the above-described CAM, together to access the same cache is advantageous in certain types of applications, such as tasks in a network processor that access network-related data in the cache. In such applications, data for a cache line needs to be initially loaded, but once loaded any data in the cache line is quickly accessed using the table, if the same task repeatedly accesses the same cache line (e.g. when processing a packet or cell of traffic in a network).

Although a specific table has been described above for some embodiments, other embodiments may employ a different RAM-based addressing structure that also uses a task identifier, such as a linked list. Furthermore, instead of using a task identifier, other embodiments may use any other indicator of the context in which access to a cache is being made, such as an external memory pointer. For example, each task may be allocated a number of external memory pointers (which may be fixed in number, or software programmable), and each external memory pointer (or a portion thereof) may be used along with (or instead of) the task identifier to check if the data is present in the cache.

Therefore, in some embodiments, two attempts are made to identify an entry in the same cache: a first attempt uses a RAM-based addressing structure (such as the above-described table) and a second attempt (on failure of the first attempt) uses a CAM-based addressing structure. The RAM-based addressing structure is faster than the CAM based-addressing structure, and in cases of a hit on the first attempt, cache performance is based on RAM cycle time rather than CAM cycle time. On the other hand, a miss on the first attempt does not mean that the data is not present in the cache. Instead, a second attempt using the CAM in the traditional manner finds the data if present in the cache.

BRIEF DESCRIPTION OF THE DRAWINGS

FIG. 3A illustrates, in a high level block diagram, one specific implementation that uses a RAM table 311 and a CAM 312 to access a cache 320 in accordance with the invention.

FIG. 5 illustrates, in a block diagram, one example of a cache used in the implementation illustrated in FIGS. 3A and 3B.

FIG. 6 illustrates, in a block diagram, one example of an addressing structure of this invention that is used with the cache of FIG. 5.

DETAILED DESCRIPTION

Figure 1A:
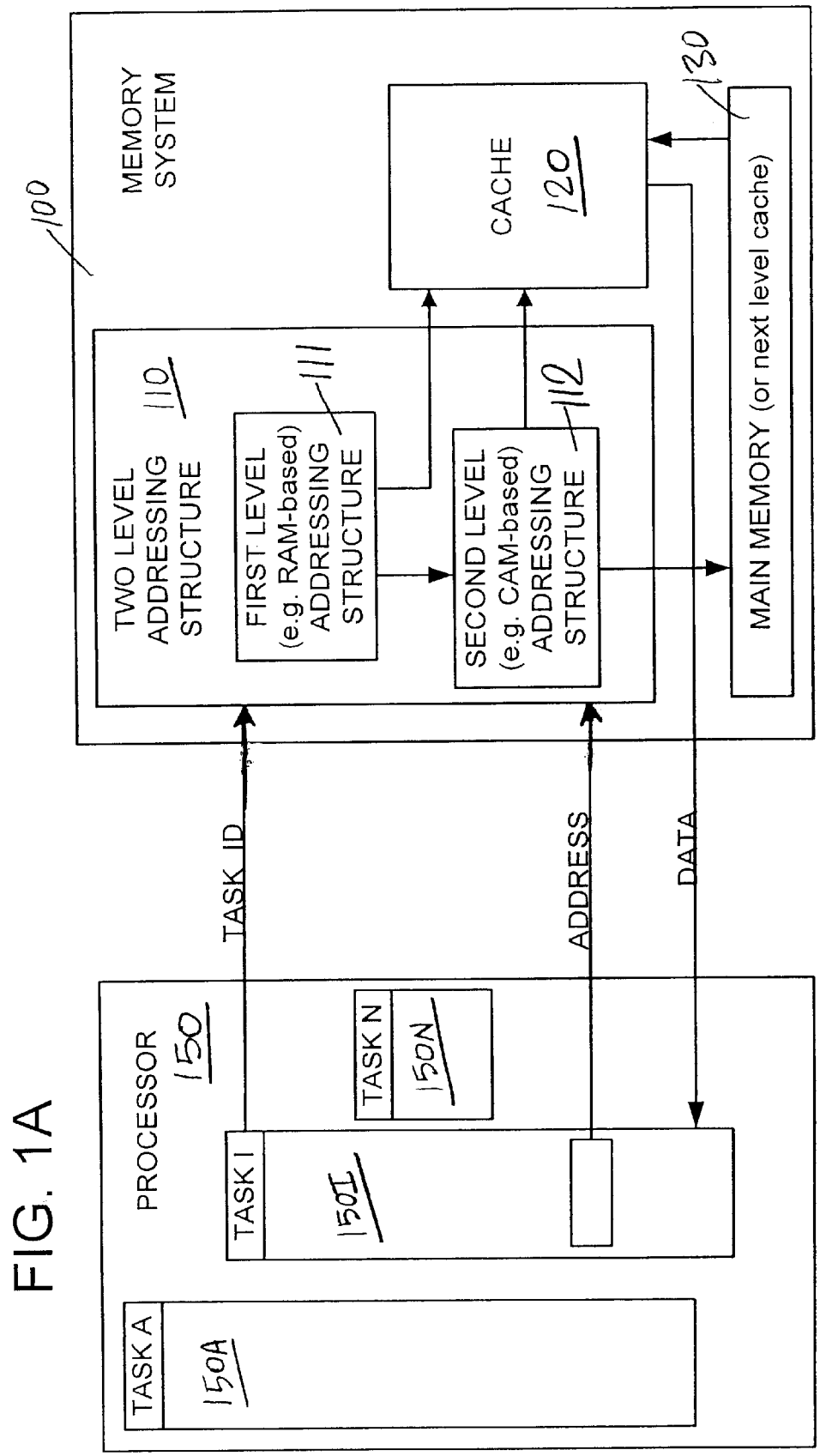
FIG. 1A illustrates, in a high level block diagram, two addressing structures to access a cache in accordance with the invention.

In accordance with the invention, a two level addressing structure 110 is used to access a single cache 120 (FIG. 1A). Cache 120 may be of a conventional design, e.g. have sufficient memory to store a fixed number of cache lines, and handles fill commands or copy back commands. Cache 120 acts as a temporary buffer for the data held in a larger memory 130, which may be a main memory (implemented as a dynamic random access memory (DRAM)), or a next level cache in case of a multi-cache implementation (e.g. cache 120 may be a level one cache, and memory 130 may be a level two cache).

Figure 1B:
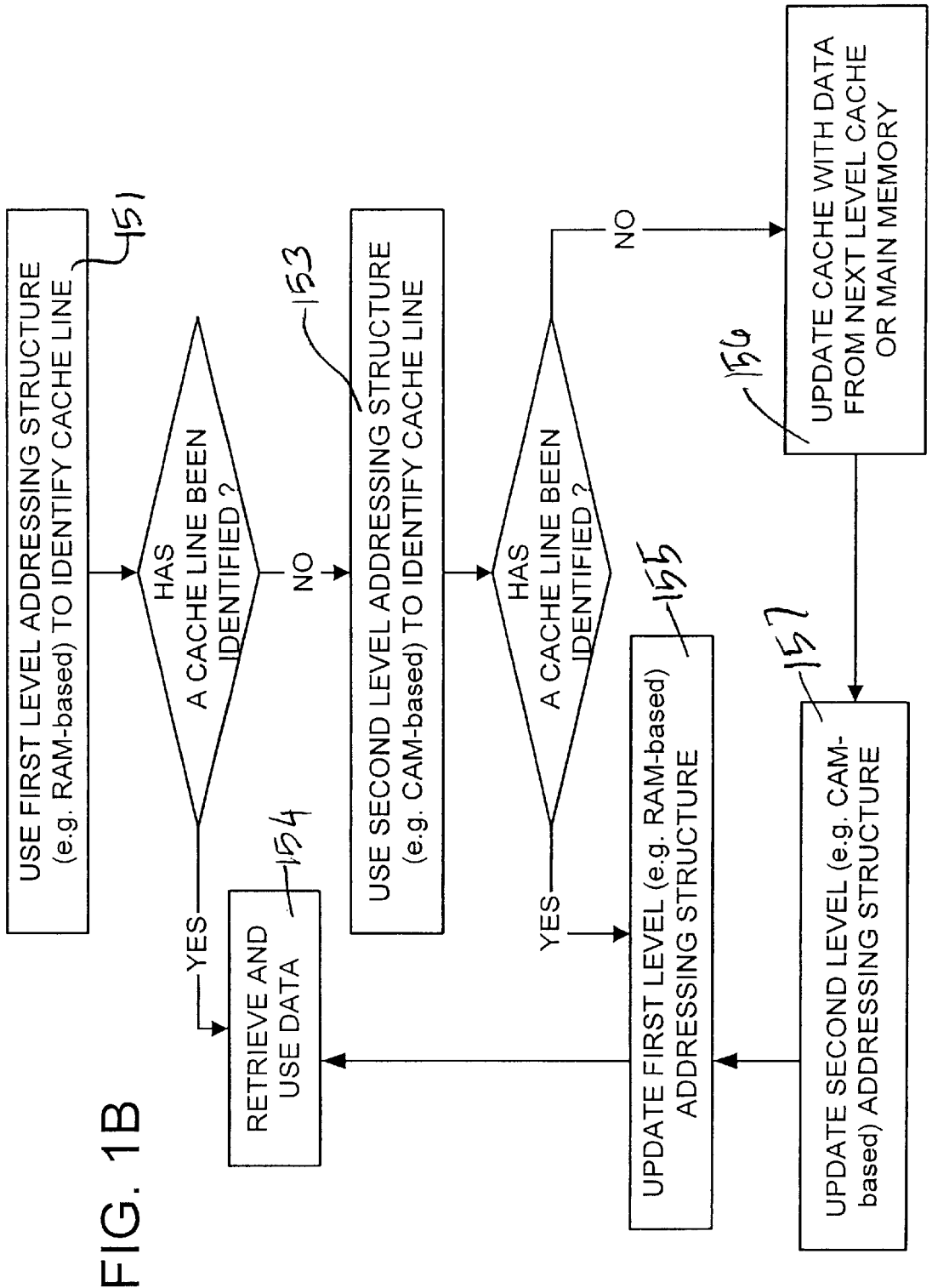
FIG. 1B illustrates, in a flow chart, use of the addressing structures of FIG. 1A.

The two level addressing structure 110 of certain embodiments includes two structures that perform a similar (or identical) function: a first level addressing structure 111 that is used first to access he cache (as per act 151 in FIG. 1B), and a second level addressing structure 112 that is used also used to access the cache but only in case of a miss in the first level addressing structure 111 (as per act 153 in FIG. 1B)

If there is a hit in the first level addressing structure 111 then data is immediately retrieved from cache 120 and used (as per act 154 in FIG. 1B). If there is a hit in the second level addressing structure 112 then the first level addressing structure 111 is updated (as per act 155 in FIG. 1B), and in addition data is immediately retrieved from cache 120 and used (as per act 154 in FIG. 1B).

If there is a miss in the second level addressing structure 112 then the data must be fetched from the next level memory, such as main memory 130 (as per act 156 in FIG. 1B), and the second level addressing structure is updated (as per act 157 in FIG. 1B), followed by performance of acts 155 and 154 which have been discussed above.

First level addressing structure 111 (FIG. 1A) is designed to be faster than second level addressing structure 112, so that the two level addressing structure 110 provides a speed improvement over a conventional access of cache 120 using only the second level addressing structure 112. In certain embodiments, the second level addressing structure 112 is based on a CAM, and the first level addressing structure 111 is based on a RAM. However, in other embodiments, other kinds of storage devices may be used.

Moreover, in certain embodiments, two level addressing structure 110 uses, in addition to an address of the data being sought, at least one additional number, such as an identity of the task that is seeking the data. Specifically, as illustrated in FIG. 1A, a number of tasks 150A–150N (wherein A<I<N, N being the total number of tasks, e.g. 140) may be implemented in a processor 150, and when seeking to access data each task 150I provides its own identity in addition to an address of the data being sought. The task's identity is used by the first level addressing structure 111 of some embodiments to determine the presence of data in cache 120. Although a task identity is used in certain embodiments described below, other numbers indicative of the context can also be used in this manner, as would be apparent to a person of skill in the art.

In certain embodiments, a first level addressing structure is similar to a direct mapped cache organization in the sense that tags (wherein each tag constitutes a fixed number of high order bits of an address) are held in a RAM structure 211 (FIG. 2A), e.g. in a column 211A. The difference is that tags in structure 211 (in such embodiments) are indexed using an identifier of a task that is requesting the data, rather than low order bits of the address as in a conventional direct mapped cache. Note however, that other structures and/or organizations for accessing a cache may be used in other embodiments of a first level addressing structure.

Figure 2A:
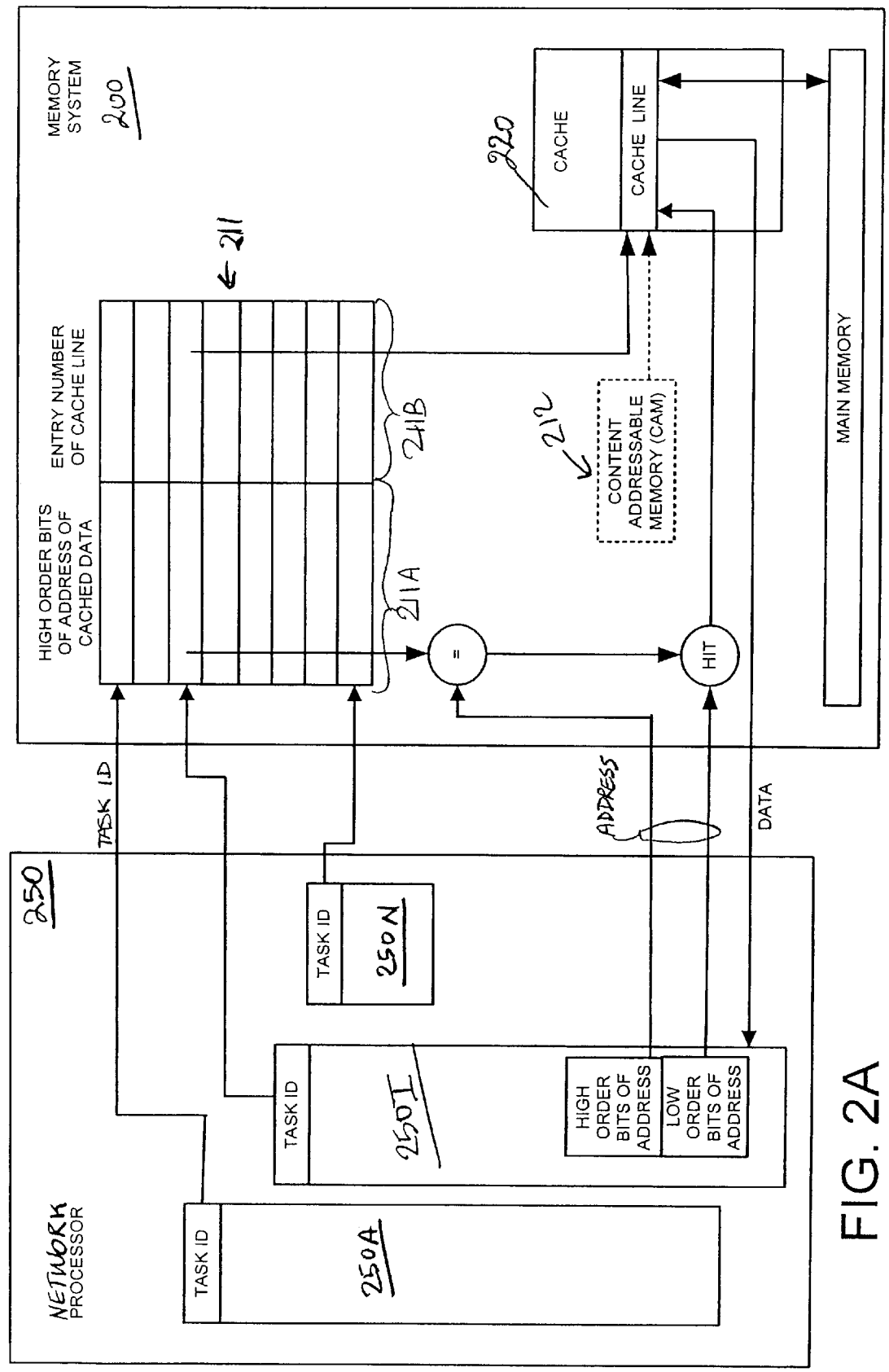
FIGS. 2A–2C illustrate, in intermediate level block diagrams, use of just a first level addressing structure in case of a&hit, use of a second level addressing structure in case of a miss in the first level addressing structure, and loading of the two addressing structures in case of a miss in both structures.
Figure 2B:
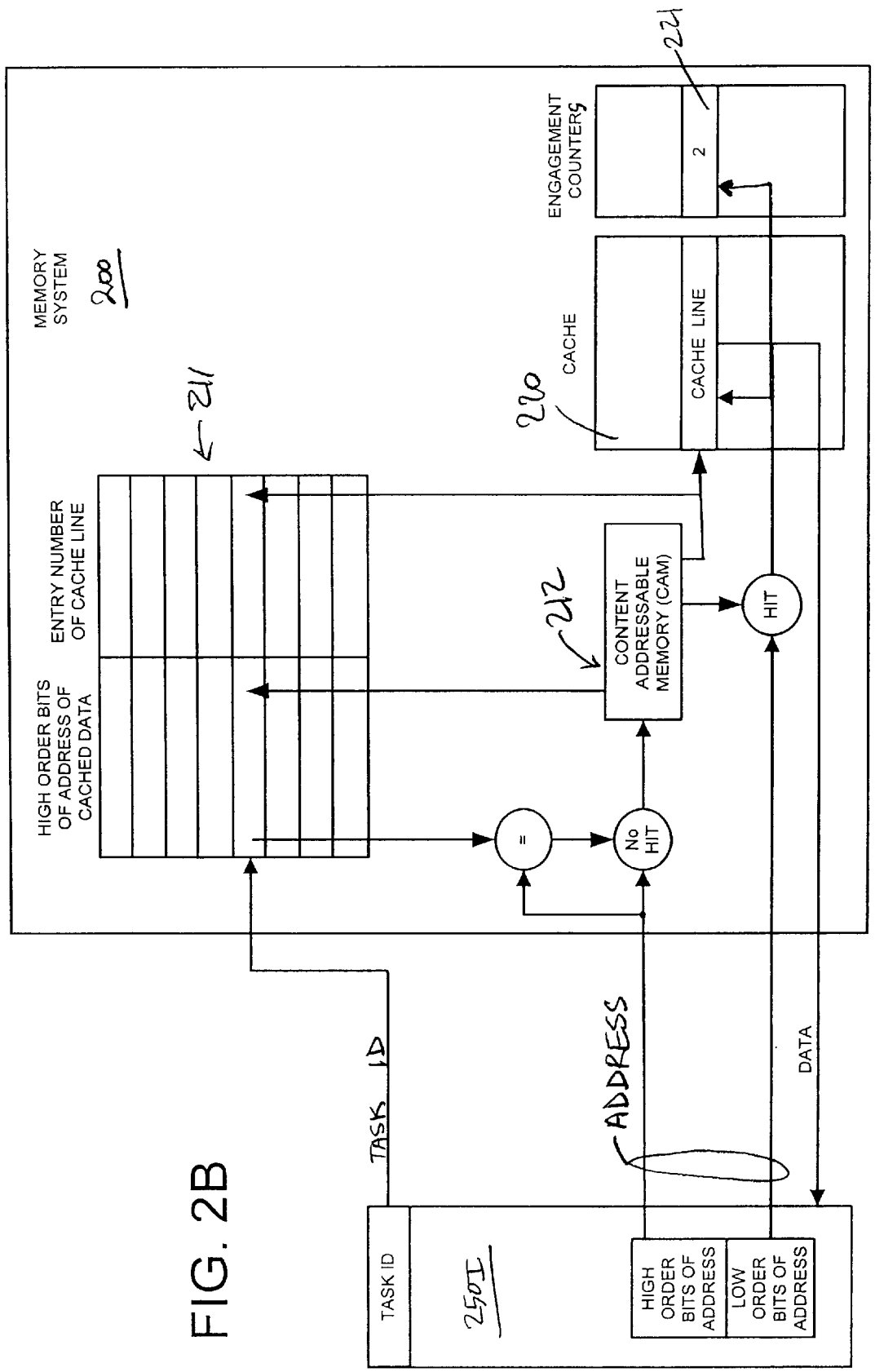
Figure 2C:
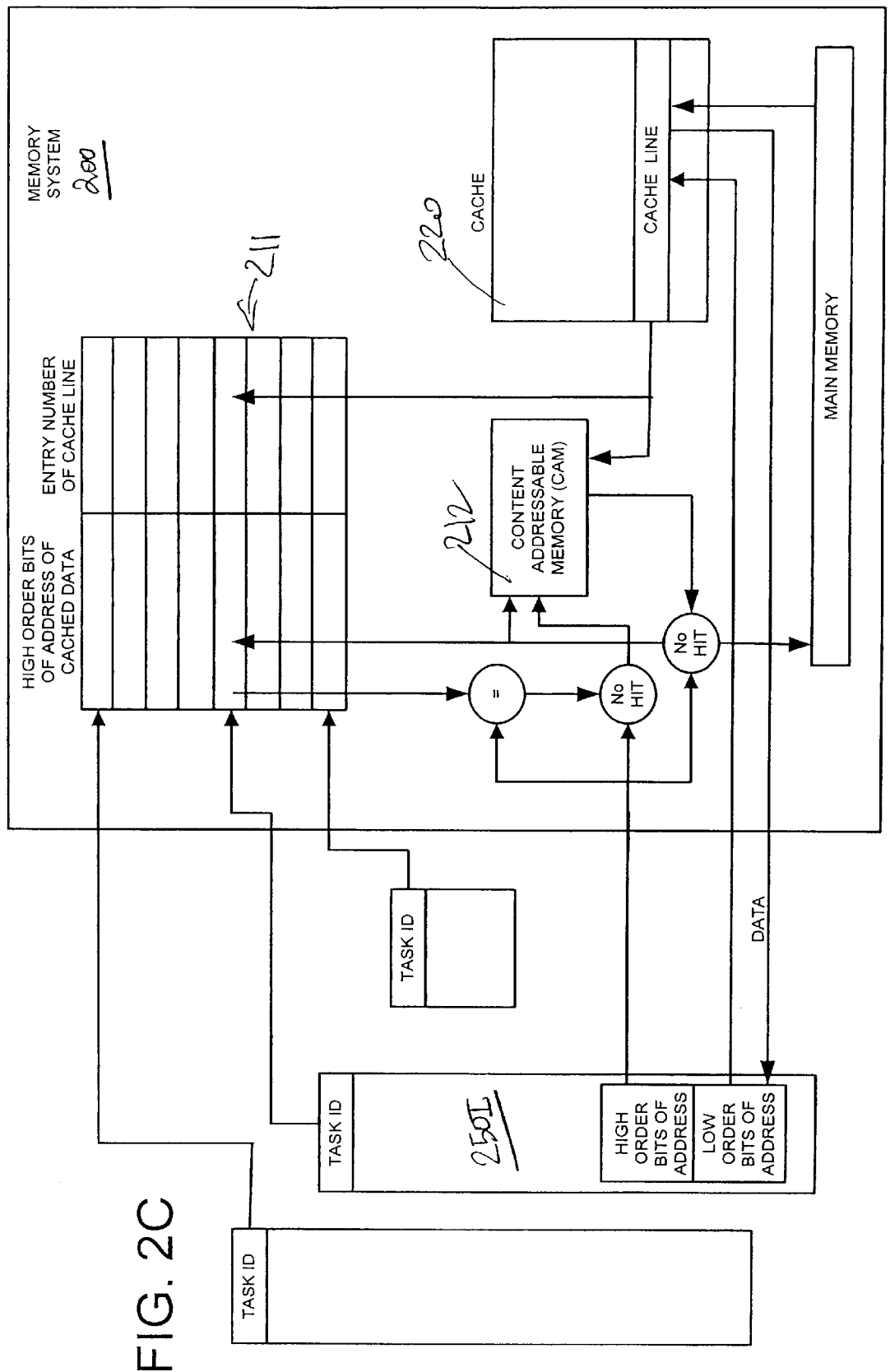

Note that FIGS. 2A–2C illustrate one specific example of the embodiment illustrated in FIG. 1A, and the reference numerals in FIGS. 2A–2C are obtained by adding 100 to the corresponding reference numerals in FIG. 1A.

In some embodiments, a value provided by first level addressing structure 211, e.g. from a column 211A (which value was identified from a table look up using the task identity as an index) is compared with the corresponding high order bits of the address (i.e. a tag) provided by the task. If the comparison finds a match, then a corresponding entry number for the data in cache 220 is retrieved. Such an entry number may be located in a column 211B of the same table 211 (or alternatively in a separate array of data pointers that is also indexed by task identifier and that forms a portion of the first level addressing structure). Moreover, in some embodiments, the just-described entry number may be retrieved at the same time as the value used in the comparison.

Such a cache line entry number is then used (in case of a match) as an index into the cache 220, to provide the data being sought to the task that supplied the address. Therefore, in case of a match in using table 211, there is no need to use a CAM (or whatever other second level addressing structure is being employed). For this reason, the CAM is shown dotted in FIG. 2A.

In case of no match, the fixed number of high order bits of the address (i.e. the tag) are used to perform a second level lookup. In some embodiments, a second level look up uses a CAM 212 (FIG. 2B) as the second level addressing structure. CAM 212 holds tags for all the data that is valid in cache 220. If CAM 212 finds a match, then a hit occurs, and data from cache 220 is supplied to the requesting task, and in addition a table entry for this task is updated in structure 211.

A hit in CAM 212 may occur, for example, if another task is accessing the same cache line. If so, a counter 221 (also called "engagement counter".) is incremented. Counter 221 is decremented whenever a task dies (or is terminated) or starts using other data. Moreover counter 221 is used to decide if a cache line should be replaced: if counter 221 is greater than or equal to 1, there will be no replacement of the cache line (e.g. because one or more tasks are currently using the cache line).

If there is no match in CAM 212 (FIG. 2C), it is a miss, and the data is fetched from another memory down the memory hierarchy (external memory or level two cache). Since the second level lookup is performed only on a miss in the first level lookup, a performance penalty due to CAM usage has a negligible impact on total system performance.

Certain embodiments provide predictability in the memory system as follows. Specifically, each task is programmed with an assumption of a miss in the cache for the very first access to a cache line. In view of this assumption, the task should not perform another access to the same cache line, until the cache line has been filled. Once a cache line is filled, subsequent accesses by the task perform only a first level lookup (e.g. using table 211), until there is a change in address.

Occasionally, if there is a miss in table 211 (on the first access), there may be case of a hit during a second level look up. In this case, the performance gain (over accessing main memory or the next level cache) is a "bonus".

Table 211 and CAM 212 may be used (together) to access a cache in certain applications where tasks perform a large number of accesses to locations in memory that are adjacent to one another, e.g. to consecutive memory locations when accessing a database record that is associated with processing a packet. In such applications, cached entries must be used to make sure that coherent data is used. A large amount of data (e.g. in the database record) may be fetched ahead of time and stored in a cache line (or in multiple cache lines depending on the embodiment), although only one storage location (in the database record) is being accessed at the moment. Coherency is more easily maintained when the entire database record is cached and accessed as described herein.

Use of two or more addressing structures (such as table 211 and CAM 212) together to access the same cache is advantageous in certain types of situations, such as tasks in a network processor that access network-related data in the cache. In such applications, data for a cache line needs to be initially loaded into table 211, but once loaded any data in the cache line is quickly accessed using table 211, if the same task repeatedly accesses the same cache line (e.g. when processing a packet or cell of traffic in a network).

During the initial loading of data into the cache line, a processor that executes a task seeking the data (also called "first task".) may switch to executing another task (also called "second task".), and return to the first task when the cache line has been filled. For more information on a specific example of tasks that are executed by a network processor and data that may be cached for such tasks, see U.S. Pat. No. 6,330,584 granted to Joffe, et al. and entitled "Systems and methods for multi-tasking, resource sharing and execution of computer instructions" that has been incorporated by reference above.

Therefore, in some embodiments of the present invention, a memory system 200 for a network processor 250 includes a multi-level addressing mechanism of the type described above, for accessing network-related data held in an on-chip memory 220. Specifically, two or more lookup mechanisms of the type described above may be used to access the very same memory 220 which acts, in some embodiments, as a first level cache for network processor 250. In such embodiments, cache 220 may be used to store, for example, <address, information> in each cache line, and network processor 250 uses the information supplied by cache 220 to route a packet to the appropriate output port (or ports in case of multicast packets).

Depending on the embodiment, a look up table 211 may have one or more entries (e.g. a handful of entries) for each of a number of tasks 150A–150N that access a cache 220. If multiple entries present in table 211 for each task, each of the multiple entries is compared simultaneously (in some embodiments) to the address of the data being sought, to check if there is a hit. In certain embodiments, each task may have up to 2, 4 or 8 entries in table 211, and the number of such entries may be made software programmable.

In order to simplify implementation of cache 220 in some embodiments, each task's first access to a cache line is required to be a LOAD instruction (i.e. not a STORE instruction). Until the LOAD instruction is completed, the task is required to not perform any other access. Such a restriction simplifies operation of the-cache and the acts performed in retrieving data, as described herein.

When the data being sought is received from memory, table 211 can be updated immediately, because the next access from the same task is be performed only after the current line fill is completed. Furthermore, unless there is another access to the same cache line in cache 220, the memory system can avoid sending multiple accesses to CAM 212 (only the first access is sent). This assumption allows a per task database record to be maintained in a cache, without duplicating and increasing the size of table 211.

One specific implementation, a memory system 300 includes a table 311 of the type described above in an external memory access unit 313 that receives addresses and task identities from a microprocessor (such as a network processor), and provides the requested data. Memory system 300 also includes a CAM 312 of the type described above, that is accessed by external memory access unit 313 when there is a miss in table 311. External memory access unit 313 receives an update of the corresponding entry from CAM 312 (either immediately if there is a hit in CAM 312 or after a cache line fill if there is a miss in CAM 312). In case of a hit in table 311, external memory access unit 313 provides a request to a cache interface unit 350 that includes two paths, one path through a sequencer 351 that arranges the requests in order (as per a sequence number which indicates the order of arrival of packets), and another path through a first-in-first-out structure 352 that simply buffers the requests and supplies them at a rate at which they can be handled by cache 320.

Memory system 300 also includes another first-in-first-out structure 315 that buffers the addresses on which there was a miss in CAM 312, for a sufficient time during which the cache line is filled, and thereafter supplies the missed addresses to cache 320. When a cache line is to be filled, the address is provided to an external memory interface 333 that in turn includes a first-in-first-out structure 332 that buffers the missed addresses being issued to external memory, and another first-in-first-out structure 331 that buffers the line fill data on its way to cache 320. The data from first-in-first-out structure 331 is also provided to yet another first-in-first-out structure 340 that initiates a retry in table 311.

Operation of memory system 300 is described below in reference to a flow chart illustrated in FIG. 3B. In this specific implementation, sequencer 351 is included (e.g. with an execution unit that performs instructions) in a special purpose unit (SPU). The SPU is used in some embodiments, to ensure that the bandwidth of a bus to cache 320 is kept busy. Terminology used in the following description is summarized in the following table.

| | |
|---|---|
| External memory interface 333 | XMI |
| External memory access unit 313 | XMAU |
| CAM 312 | XCAM |
| Engagement counter 221 | XCOUNT |
| table 311 | Task entry table |
| Cache 320 | XCACHE |
| first-in-first-out structure 352 | Unseq_Fifos |
| first-in-first-out structure 340 | Retry_Fifo |
| first-in-first-out structure 315 | miss_fifo |
| first-in-first-out structure 331 | linefill_fifo |
| first-in-first-out structure 332 | miss_flush_fifo |

Figure 3B:
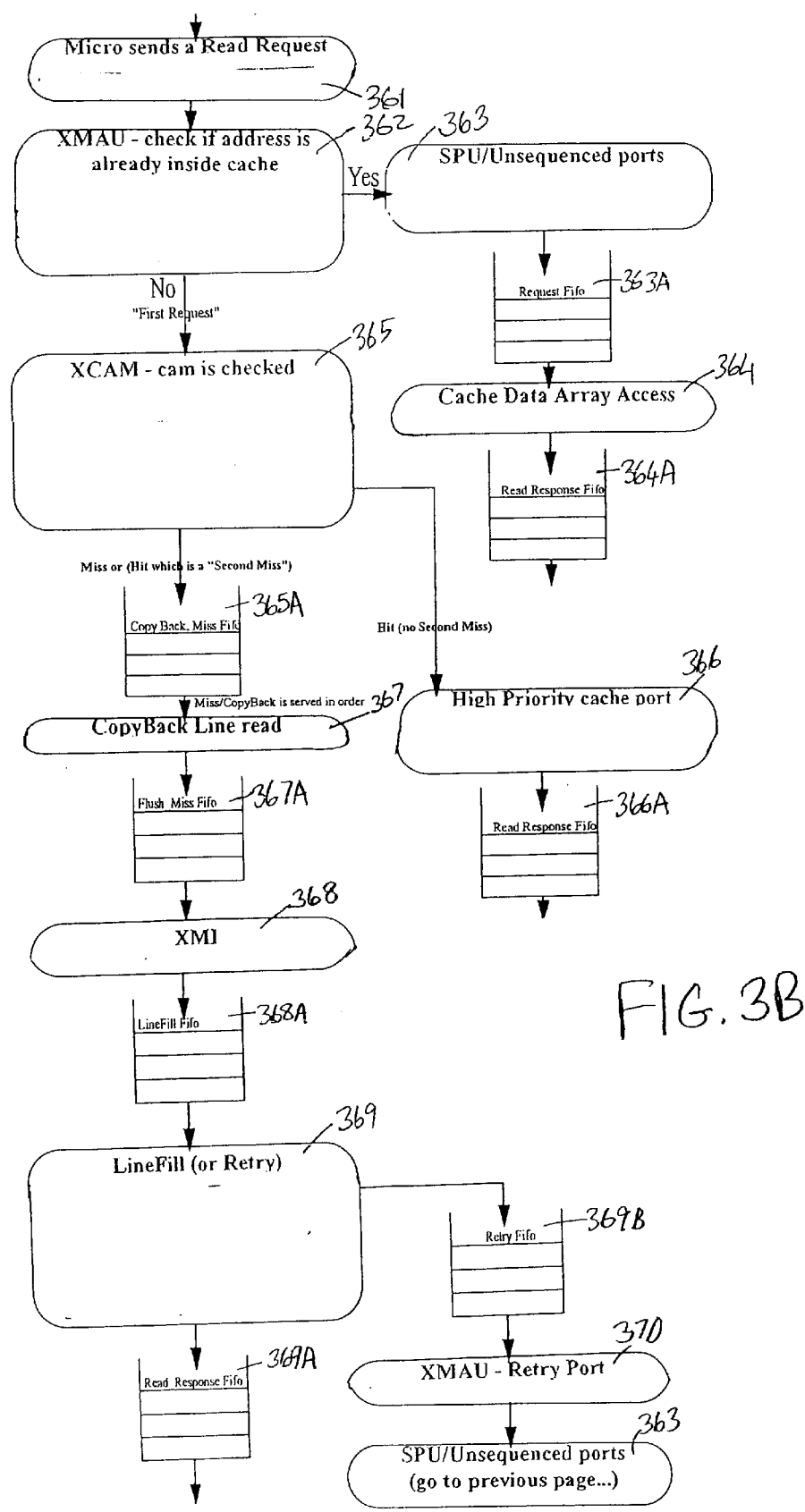
FIG. 3B illustrates, in a flow chart, acts performed in various blocks illustrated in FIG. 3A.

In one implementation illustrated in FIG. 3B, a number of stages are coupled to one another through FIFOs. Specifically, in act 361, a microprocessor sends a read request to memory system 300. Memory system 300 operates under the assumption that the first access to any line is a LOAD instruction and the microprocessor will use the result of the LOAD immediately, so that there will not be another access, till memory system 300 returns the result of the first access.

Next, the XMAU 313 checks (as per act 362) if the address is already in cache 320, by comparing the address of the data to be fetched against a current task's tag in table 211. At this stage, XMAU 313 also reads the entry number, in case the data is inside a cache line in cache 320. If the result is yes, then the entry number is sent to the cache interface 350 (i.e. to SPU or to Unseq_Fifos). If the result is no, then the address is sent to XCAM 312 as a "First Request."

Cache interface 350 on receiving a cache entry number, passes it to cache 320 via a request fifo 363A so that the data can be accessed. Specifically, the cache 320 receives (in act 364) a portion of the address (e.g the least significant bits) from the task and also the cache entry number. The cache 320 supplies the data to a read response FIFO 364A.

In case of a "no" result in XMAU 313 (as per act 362), then XCAM 312 is checked as per act 365. Specifically, XCAM 312 tries to find whether the line is already existing in the CAM. On a miss: the address is sent to the next stage, a Miss FIFO 365A. Specifically, the XCAM puts the Miss Address in the FIFO 365A. If needed the XCAM may also put the copy back address in FIFO 365A. On a hit: the XCAM checks whether a linefill has already been made. Specifically, XCAM checks if "LineFill completed" flag is set and if so, sends the entry directly to cache 320. If we are still in the process of bringing the cache line in from memory, then the XCAM sends the line to the XMI through the Miss FIFO. XMI will just return the transaction back.

Next, in case of a hit that is not a second miss, an entry number in the cache goes to a high priority cache port stage 366, because the line is in the cache. In this case, stage 366 passes the entry number to the cache when accessing it, and provides the data from the cache in a read response fifo 366A. Note that in this particular implementation, FIFO 366A is same as read response FIFO 364A that receives data from cache data array access 364 and also same as the read response FIFO 369A that receives data from LineFill 369. Next, as per act 367, a copy back line is read and added to the Miss information, and sent to XMI 333 through a Flush_Miss Fifo 367A. XMI 333 gets (as per act 368): (1) Miss address, (2) Copy Back ("CB") address and cache line entry number, and (3) "Second Miss" indication. If no "Second Miss", XMI 333 fetches Miss Line and returns Miss Line to next stage, in the normal manner. If "Second Miss" is true—XMI 333 sends Miss Address immediately to do a Retry on that Miss (when we do it, it is guaranteed to be a Hit). Note that the Miss Address is not sent to LineFill FIFO 368A, because it is already in the CAM, e.g. for use by con_MissLogic (see block 608 in FIG. 6) that is used to handle a consecutive miss quickly, without requiring the consecutive miss to wait for the data to be loaded into and retrieved from the CAM.

In act 369, a LineFill (or Retry) logic in XMI 333 does the following: If no "second miss", performs linefill: the appropriate line is written to cache, e.g. via the read response fifo 369A. Entry in CAM 320 is tagged as "LineFill Completed"—to avoid future Second Misses. In act 369, if there is a "Second Miss", the LineFill logic performs a Retry to the whole Miss—now it must be a "non—Second Miss" (guaranteed by the order of operations). Note that it is not necessary to do this, e.g. can directly access the cache, which can simplify the circuit design. In act 369, the Miss Address is sent to the Retry Fifo 369B, together with the entry number.

From the Retry FIFO 369B, the address automatically goes to the SPU/Unsequenced stage (via the XMAU Retry Port 370). In this case, it is guaranteed that we have a hit and we use the entry number from the Retry Fifo. Then go to SPU/Unsequenced ports (described above).

Certain situations that may arise during operation are discussed below:

1. Miss of Y and copyback of Z, then Miss on Z. We invalidate the CopyBack line immediately on the Miss of Y. It means that the Miss on Z is a real Miss. Since we perform the Miss operations in order, then we will actually write the whole line into the xcache and then read the whole line back into the xcache.

2. Miss of Y, then second Miss of Y (line hasn't been fetched yet). The misses are served in order. The first Miss is written into the CAM, into entry G, and a "Being Fetched" bit is set for entry G. The Second miss will hit the CAM, in entry G. The "Being Fetched" bit is set therefore we send the Second Miss with "Second Miss" indication to the Miss FIFO. The Second Miss will follow the same path as the First but will be treated by the XMI differently. It is being immediately returned, without any value, but with the original Address. The returned transaction will be sent back to the XMAU to perform a retry. It is guaranteed the Retry will start only after the linefill of the first Miss has been performed—therefore it is guaranteed the Retry is a hit. (Note that the retry is sent with the entry G and therefore the accesses of the Retry Port in XMAU can go directly to the SPU/Unsequenced FIFOs and from there to cache 320.

3. Store of Y, Then Load of Z (CAM decide to flush Y). Unseqenced stores operation from XMAU are written directly to XCACHE and not to the unseq_fifo. The XCACHE shall always grant those request (gets the highest priorty). This assures that the write request shall be executed before the flush operation, coming from the Miss_Fifo.

Figure 4A:
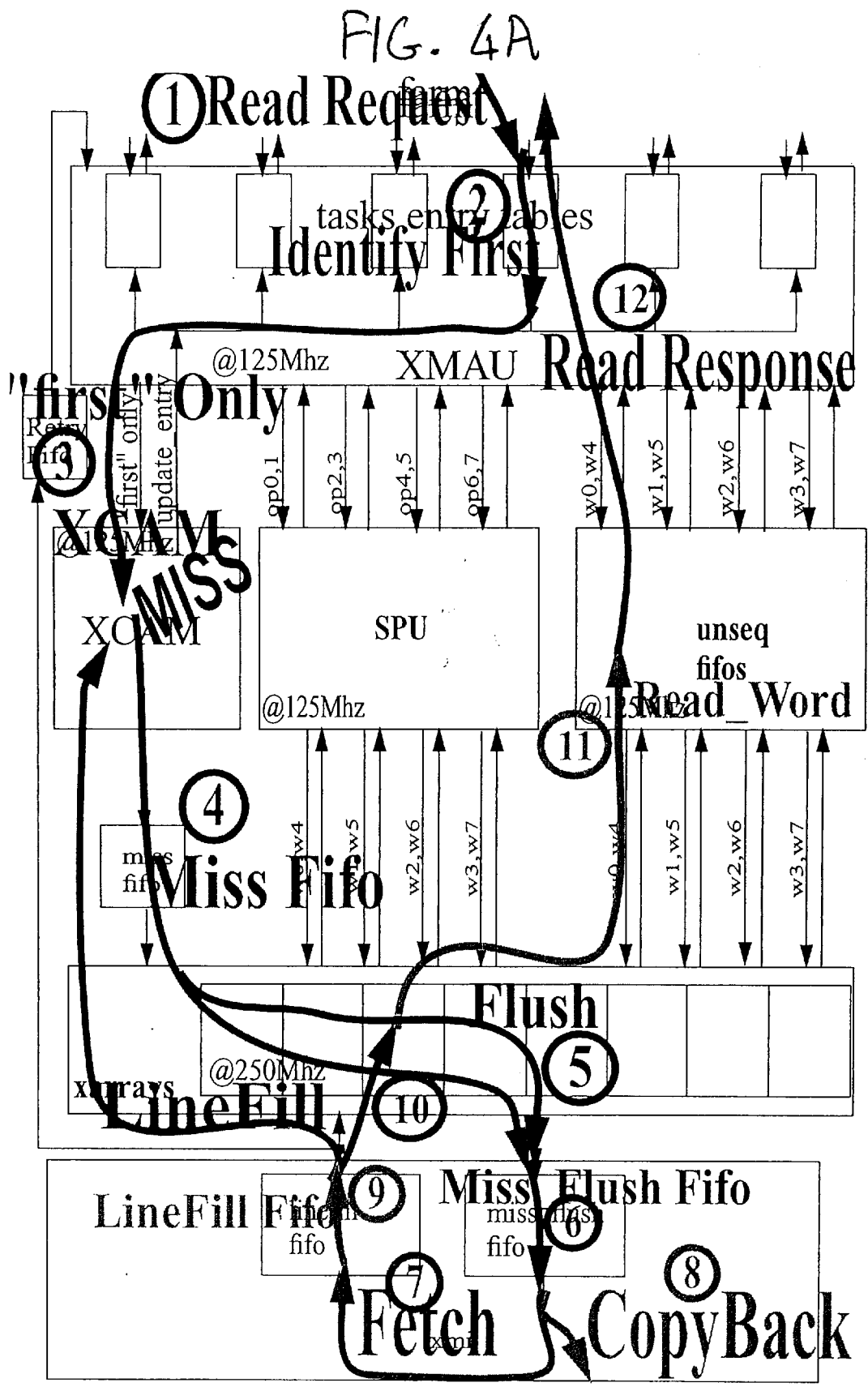
FIGS. 4A–4F illustrate, in flow charts, acts performed under various conditions, in the implementation illustrated in FIGS. 3A and 3B.

NORMAL MISS describes the case (see FIG. 4A) where the requested line is not in the cache and is not being fetched right now, by a previous miss, as illustrated by the following acts:

(1) Read Request: One of the tasks in a network processor sends a Read Request to the memory system. The Request is comprised of: (a) Address, (b) Task Number, (c) Global Sequence Number, (d) Destination Register Number.

(2) Identify First: The first action, done in XMAU, is to check whether this is the first access to this line. We compare the read request's address against TAG we stored before, in the previous "first" identification. We do the following action: we store the TAG portion of the new address (again for identification of an access to another line). Note that right after reset, we automatically create a miss.

(3) XCAM—Only First Access. Assuming we identified a "first" access we send it, through the XMAU to an XCAM bank. The XMAU is doing the arbitration between all the "first" accesses, as a regular bank. Note that the XCAM allows accesses once per 2 cycles. Each operation lasts 2 clocks. We first check, if the line already resides in the cache (In case another task has already brought the line in). The current case is Miss. The other cases will be explained later. At this stage we perform the following: (a) Select an entry inside the xcache/xcam where the fetched line will be stored. This is done according to a policy-Refer to specific description of the Replacement Policy. (b) Store Miss Address inside the XCAM (c) Set the "Being_Fetched" bit (we have one per entry): This bit will be cleared when we complete the line fill. This bit indicates for any next Hit if we have to treat it as a "Second Miss". We move all required fields to the next stage: Miss Fifo.

(4) Miss Fifo The Miss with its fields is sent to Miss Fifo. The transction will wait in the Miss Fifo, until we perform the dirty line read from the xcache data arrays. The Miss Fifo Fields: (a) Miss Address, (b) Entry,where that miss will be held when we bring it, (c) Stored Data (Needed for non-cacheable access), (d) CopyBack Address (e) CopyBack Dirty attributes (to perform either one or two writes to external memory). (f) Attributes: 1.read/write, 2. Byte Enables for store miss 3. dirty per each of the 2 halves of the dirty line. 4. cache enable attribute, (explained later). 5. Second Miss indication (explained later). Once we perform the CopyBack, the Miss will be sent together with the CopyBack line into the Miss_Flush Fifo.

(5) Flush: When granted, we perform the Flush Dirty line from the data arrays. We attach the address from the Miss Fifo to the flushed line, together with the Miss Address these are gathered together and are sent to the next stage: Miss_Flush fifo.

(6) Miss Flush Fifo: The Fifo entry is comprised of the following: 1.Miss Address 2.CopyBack Address 3.CopyBack Line (flushed dirty line)or Data for non-cacheable writes. 4.Miss Destination 5.Entry for Line fill 6.Attributes: (a) read/write, (b) Byte Enables for store miss (c) dirty per each of the 2 halves of the dirty line, (d) cache enable attribute, and (e) Second Miss indication. The Data from the Flush Miss fifo will be sent to the XMI. The XMI will perform the following steps: 1.Line fetch, and 2. CopyBack.

(7) Fetch The XMI performs a Line fetch using the Miss Address. The fetched line will be sent back through the line fill fifo (8) CopyBack The XMI performs a Line fetch using the CopyBack Address, Line. We perform a copy back of the dirty part of the line only (meaning if half the line is dirty-we will write only this half to the external memory).

(9) LineFill Fifo: The Result of the fetch is sent back to the cache through the Line fill fifo. Note that for non cacheable reads the result of the read is also send through the line fill fifo. The fields which comprise an entry in the Line fill fifo: (a) Fetched line, (b) Entry (place holder)for LineFill, (c) Miss Destination, and (d) Miss Address lsbits —tells what word to send back to destination register.

(10) LineFill: Once granted we perform actual line fill. Line fill is movement of the fetched line into the cache. Line fill operation also causes clear of "Fetch_Bit" (of the line fill's entry) For Line fill we need: (a) Fetched Line (b) Entry (place holder)

(11) Read Word Now: we send the requested word back to the unsequenced response fifo. We need: (a) Selected Word from the Line. (We need the Miss Address lsbits to select the word) (b) Miss Destination Register ID. The Read Word is done through the normal hit path.

(12) Read Response From the unsequenced response fifo we send the response back to the required Micro (through the XMAU). (a) Response Word (b) Miss Destination Register ID. The Read Response is done through the normal "hit" path.

Figure 4B:
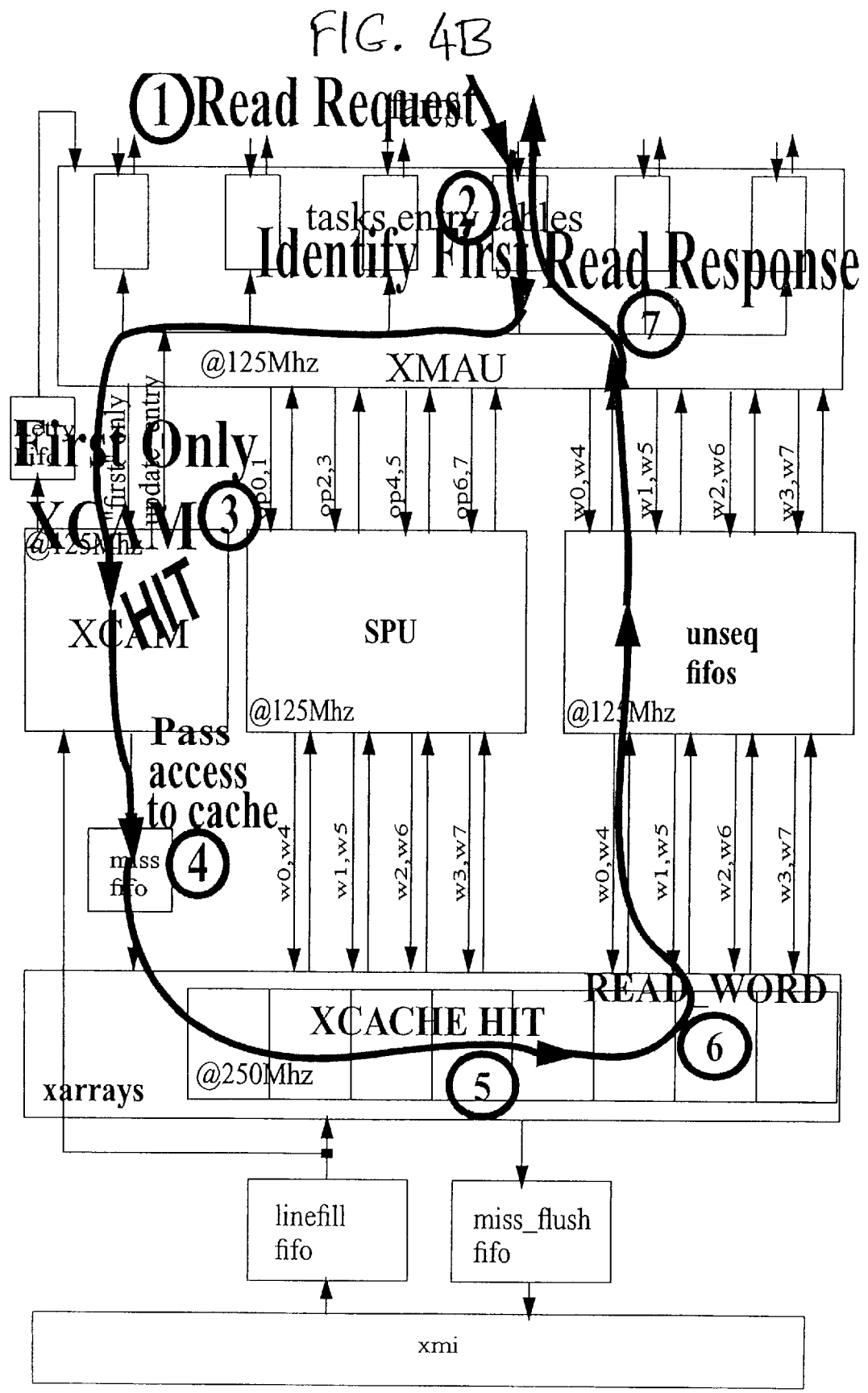

XCAM HIT (non Second Miss) describes the case when we get a "first" access from one of the tasks. We check, in XCAM, if the requested line resides already within the cache. If the result is "Normal Hit"—it means the line is already inside the cache and is not in a process of bringing the line in. This means we can go directly to the cache and the line is already there. This case is illustrated in FIG. 4B, and discussed below:

(1) Read Request is identical to (1) discussed above in reference to FIG. 4A.

(2) Identify First is also identical to (2) discussed above in reference to FIG. 4A.

(3) XCAM—Only First Access. Assuming we identified a "first" access we send it, through the XMAU to an XCAM bank. The XMAU is doing the arbitration between all the "first" accesses,as a regular bank. Note that the XCAM allows accesses once per 2 cycles. Each operation lasts 2 clocks. We first check, if the line already resides in the cache (In case another task has already brought the line in). At this case we get a Hit in XCAM. We check the "Being_Fetched" bit of the hit entry. At this case "Being_Fetched" bit is '0'. At this stage we perform the following: The HIT entry is the entry we need to use when access the cache directly. We move all required fields to the next stage: Highest Priority Access Port of the Xcache array.

(4) Pass access cache—Since it is a Hit (meaning the line is inside the cache), we send the request through the Miss Fifo, with all needed info: (a) Miss Address (b) Miss Dst (c) Entry Number (d) type is HIT.

(5) XCACHE HIT—from the Unsequenced Request Fifos, we go to the XCACHE, after arbitration with the SPU, LineFill, Copy-Back accesses. Note that it is guaranteed that we have a hit. We pass ahead all fields from XMAU (6) Read Word—Now we send the requested word back to the unsequenced response fifo. We need: (a) Selected Word from the Line (We need the Miss Address lsbits to select the word) (b) Miss Destination Register ID. The Read Word is done through the normal hit path.

Figure 4C:
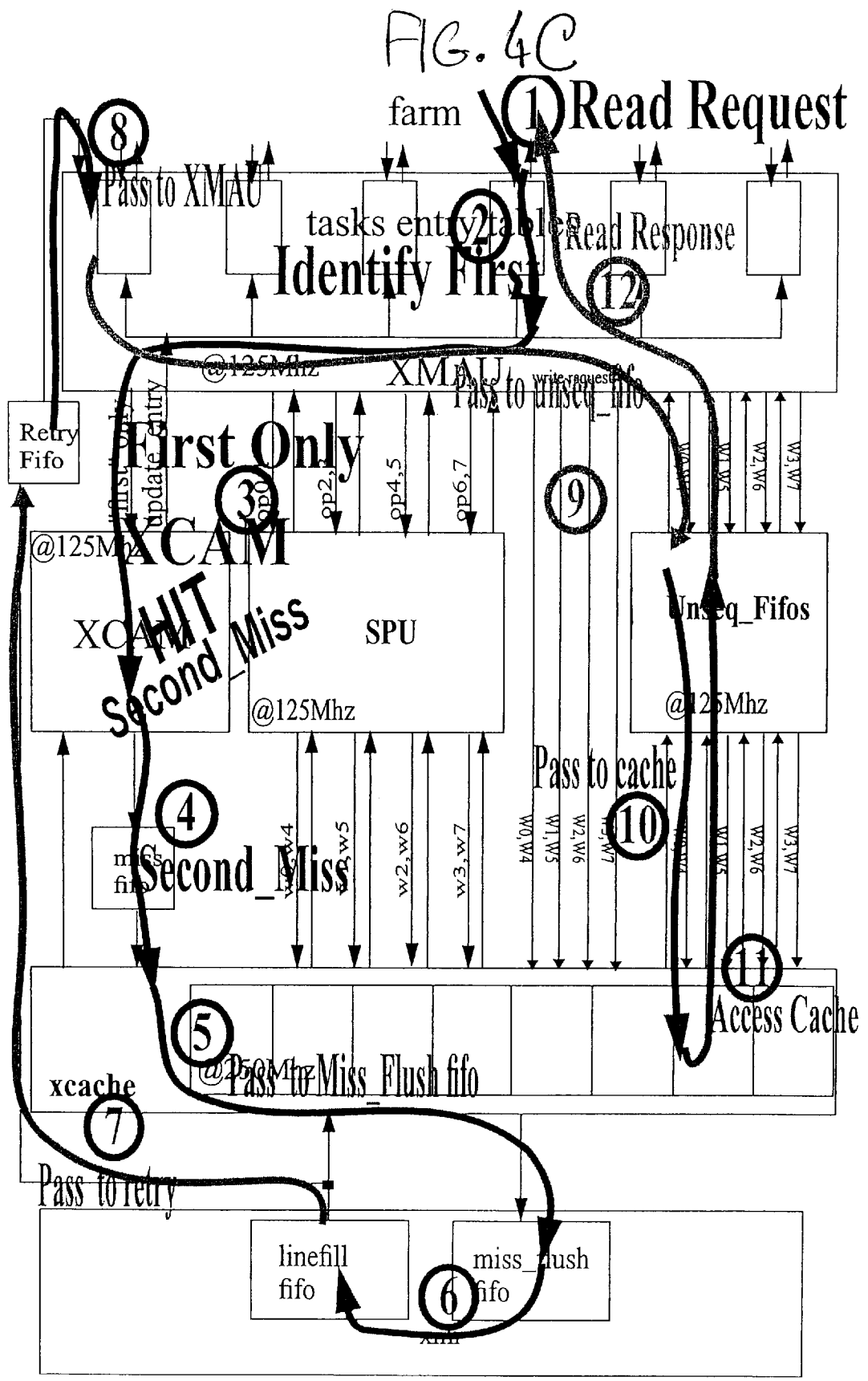

SECOND MISS describes the case (see FIG. 4C) where the requested line is not in the cache for a second time and is being fetched by a previous miss, as illustrated by the following acts:

(1) Read Request is identical to (1) discussed above in reference to FIG. 4A.

(2) Identify First is also identical to (2) discussed above in reference to FIG. 4A.

(3) XCAM—Only First Access. Assuming we identified a "first" access we send it, through the XMAU to an XCAM bank. The XMAU is doing the arbitration between all the "first" accesses,as a regular bank. Note that the XCAM allows accesses once per 2 cycles. Each operation lasts 2 clocks. We first check, if the line already resides in the cache (In case another task has already brought the line in). Current case is HIT in XCAM. We check the "Being Fetched" bit of the hit entry. In this case "BeingFetched" bit is '1'. We move all required fields to the next stage: Miss FIFO.

(4) Miss FIFO. The Miss with its fields is sent to Miss Fifo. Once the Miss is at the head of the fifo the transaction will be sent directly to the Miss_Flush Fifo through the Xcache. The Miss fields are: (a) Miss Address, (b) Miss Dst, (c) Entry Number, (d) type is Second_Miss;

(5) Pass to Miss_Flush Fifo. The Xcache transfers the Miss with its fields directly to the MissFlush Fifo;

(6) Pass to LineFill Fifo. The XMI Shall identify that this a Second_Miss and shall pass the Miss with its fields to the LineFill Fifo with Miss_Type=Second_Miss.

(7) Pass to Retry Fifo. The LineFill Fifo shall pass the miss address entry and destination to the retry fifo (8) Pass to XMAU. The retry request goes directly to the SPU/Unsequenced fifos of the xmau It is guaranteed the retry is a HIT.

Figure 4D:
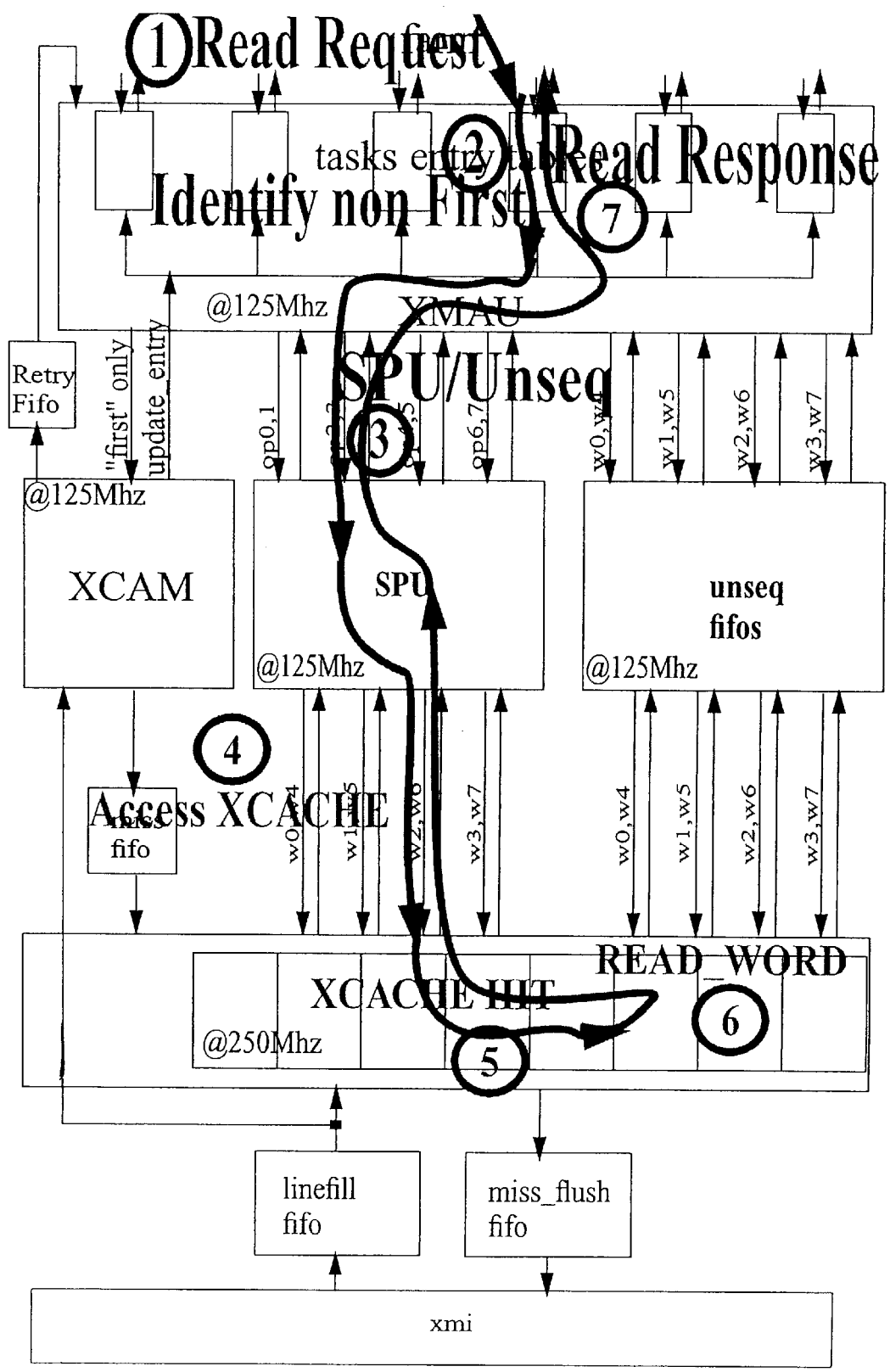

NON FIRST ACCESS READ describes the case (see FIG. 4D) where a read is issued for an address from which data was recently requested so that the requested line must be in the cache because of being fetched by a previous miss, as illustrated by the following acts:

(1) Read Request is identical to (1) discussed above in reference to FIG. 4A.

(2) Identify Non First: The first action, done in XMAU, is to check whether this is the first access to this line. We compare the read request's address against TAG we stored before, in the previous "first" identification. The current case is HIT. We read the entry number which in this case exists inside the cache and access the SPU/Unseq ports.

(3) SPU/Unseq The following fields are transfered to the SPU/Unseq ports: (a) Entry number, and (b) Destination Register.

(4) Access XCACHE (5) XCACHE HIT—The XCACHE perform read operation from the cache array using the Entry number and the Address lsbits. The result is sent to the SPU/Unseq I/F along with Destination register Identifier.

(6) Read Word—The SPU/Unseq reads the result from the read_response fifos.

Figure 4E:
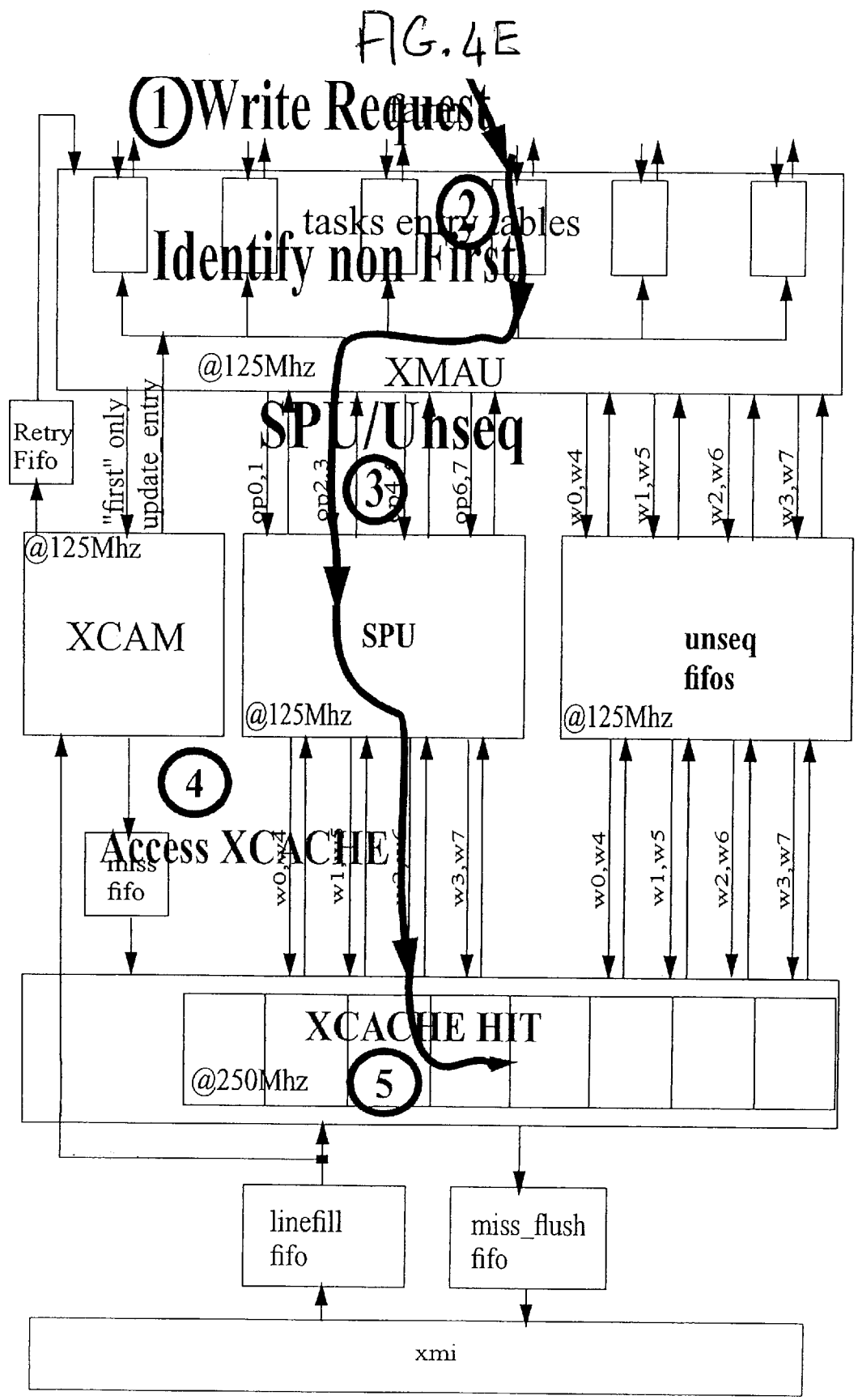

(7) Read Response—The SPU/Unseq transfers the result back to XMAU. NON FIRST ACCESS WRITE describes the case (see FIG. 4E) where a write is issued for an address from which data was recently requested so that the requested line must be in the cache because of being fetched by a previous miss, as illustrated by the following acts:

(1) Write Request is identical to (1) discussed above in reference to FIG. 4A, except for the type of request.

(2) Identify First: The first action, done in XMAU, is to check whether this is the first access to this line. We compare the write request's address against TAG we stored before, in the previous "first" identification. We read the entry number which in this case exists inside the cache and access the SPU/Unseq ports.

(3) SPU/Unseq. The following fields are transfered to the SPU/Unseq ports: (a) Entry number (4) Access XCACHE (5) XCACHE HIT. The XCACHE performs write operation to the cache array using the Entry number and Address lsbits.

Figure 4F:
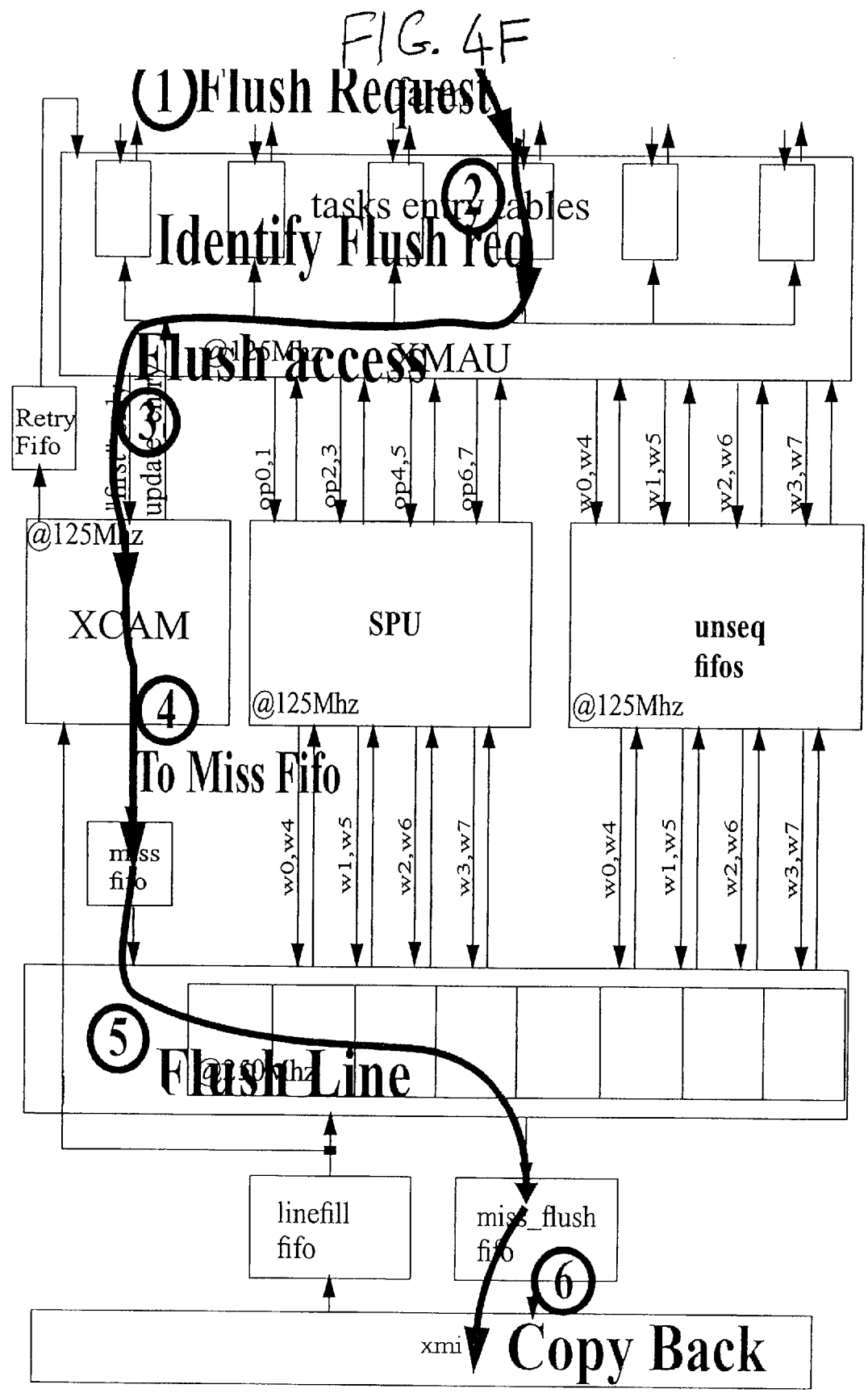

FLUSH describes the case (see FIG. 4F) where a flush request is issued for an address from which data was recently requested so that the requested line must be in the cache because of being fetched and used previously, as illustrated by the following acts:

(1) Flush Request. One of the tasks send a Flush Request. The Request is comprised of: (a) Flushed (cb)Address, (b) Task Number, (c) Global Sequence Number (2) Identify Flush Request. The XMAU identifies this request as a Flush request and sends it to the XCAM.

(3) Flush access. The XCAM identify this request as a flush request (4) To Miss Fifo. The Flush request along with its fields is sent to Miss Fifo. The relevant Miss Fifo fields: (a) Miss Copyback Address, (b) Miss entry, (c) Miss_type=Flush.

(5) Flush line. The xcache identifies the current Miss Fifo access as a Flush and flushes out the requested line. The line along with cb_addr and miss_type=flush are sent to Miss_Flush fifo.

(6) Copy back. The XMI performs copyback of the line to the external memory.

Although not described above, a cache inhibit request and a CRC request for accessing a cache can be handled in a similar manner.

In one specific example, a cache is implemented as illustrated in FIG. 5, and interfaces are as follows.

MissFifo interface
input [63:0 ]i_miss_ci_data data for CI store
input [24:0 ]i_miss_addr miss address
input [12:0 ]i_miss_dst miss destination register identi .er
input [7:0 ]i_miss_entry miss entry
input [23:0 ]i_miss_cb_addr copy back address or address for non cacheable stores
input [3:0 ]i_miss_cb_dirty cb_dirty [3 ]
--cb_data [511:384 ] cb_dirty,dirty
[2 ]--
cb_data [383:256 ] dirty,,cb_dirty [1 ] --cb_data [255:128 ] dirty,cb_dirty [0 ] --cb_data [127:0 ] dirty
input [3:0 ]i_miss_type There could be 8 types of accesses:
1. Miss-Instruct the cache to bring the line back (always read miss).
2. Second Miss-Instruct the cache to return the request for a retry
3. Hit-the line is in the cache
4. HIT_CRC-crc line is in thecache
5. CI_Read-cache inhibit read request
6. CI_Write-cache inhibit write request
7. CI_CRC-write crc data to xmi
8. Flush-Instruct the cache to .ush a line (without line-.ll)
input i_miss_be byte enable for crc store 1 -crc_data = miss_ci_data [63:32 ], 0 -crc_data =miss_ci_data [31:0 ]
input [3:0 ]i_miss_dwen double word enable, dwen [3 ] --fetch bits [511:384 ],
dwen [2 ] --fetch bits [383:256 ],dwen [1 ] --fetch bits [255:128 ],dwen [0 ] --fetch bits [127:0 ]
input i_miss_valid valid data indication
output o_xcache_full xcache full indication (goes to xmau)
Miss_Flush Fifo interface
output [511:0 ]o_mf_cb_data copy back data or data for CI_write
output [25:0 ]o_mf_cb_addr copy back address or address for CI_write
output [3:0 ]o_mf_cb_dirty cb_dirty [3 ]
--cb_data [511:384 ] cb_dirty,dirty
[2 ] --
cb_data [383:256 ] dirty,,cb_dirty [1 ] --cb_data [255:128 ] dirty,cb_dirty [0 ] --cb_data [127:0 ] dirty
output [25:0]o_mf_miss_addr Miss address
output [7:0]o_mf_miss_entry cache entry for miss data
output [12:0]o_mf_miss_dst destination register for miss data
output [3:0]o_mf_miss_dwen double word enable,dwen [3 ] --fetch bits [511:384],
dwen [2 ] --fetch bits [383:256 ] ,dwen [1 ] --fetch bits [255:128 ] ,dwen [0 ] --fetch bits [127:0 ]
output [3:0 ]o_mf_miss_type There could be 6 types of accesses:
1. Miss-Instruct the xmi to bring the line back (always read miss).
2. SecondMiss-Instruct the xmi to return the request for a retry
3. CI_Read-cache inhibit read request
4. CI_Write-cache inhibit write request
5. CI_CRC-write crc data to ext mem
6. Flush-Instruct the xmi to copyback the line (without line .ll)
output o_mf_acc Miss_Flush .fo access strobe
LineFill Fifo interface
input [511:0 ]i_lf_data fetched line data
input [7:0 ]i_lf_entry cache entry for fetched data -continued

```
input [12:0 ]i__lf__dst destination register for fetched data
input [2:0 ]i__lf__miss__adrr__1sb tells which word to send back to xmau
input [3:0 ]i ___lf__miss__type There could be 2 types of accesses:
1. Miss-Instruct the cache to bring the line back (always read miss).
2. CI__Read-cache inhibit read request
input i__lf__dwen double word enable,dwen [3 ] --fetch bits [511:384 ],
dwen [2 ] --fetch bits [383:256 ], dwen [1 ] --fetch
bits [255:__128 ],dwen [0 ] --fetch bits [127:0 ]
input i__lf__valid LineFill .fo valid indication
output o__xcache__full xcache full indication
Xcam interface
output [7:0 ]o__xcam__entry fetched line entry
input o__xcam__dwen double word enable,dwen [3 ] --fetch bits
[511:384 ],
dwen [2 ] --fetch bits [383:256 ],dwen [1 ] --fetch
bits [255:128 ],dwen [0 ] --fetch bits [127:0 ]
output o__xcam__wen write strobe
Unseq__wj, j+4 request interface X4
input [63:0 ]i__unseq__w?__data store data
input [7:0 ]i__unseq__w?__entry request entry
input [12:0 ]i__unseq__w?__dst destination register identifier
input [7:0 ]i__unseq__w?__be byte enable for store
input i__unseq__w?__addr__2 addr [2 ]tells which word to return
as response -w?, 1-w?+4
input i__unseq__w?__rd__req read req indication
input i__unseq__w?__wr__req write req indication
output o__unseq__w?__rd__ack xcache ack (only for read request)
Unseq__wj, j+4 response interface X4
output [63:0 ]o__unseq__w?__data read response data
output [12:0 ]o__unseq__w?__dst destination register identifier
output o__unseq__w?__wen response strobe
input i__unseq__w?__full .fo full indication
SPU__wj, j+4 request interface X4
input [63:0 ]i__spu__w?__data store data
input [7:0 ]i__spu__w?__entry request entry
input [12:0 ]i__spu__w?__dst destination register identifier
input [7:0 ]i__spu__w?__be byte enable for store
input i__spu__w?__addr__2 addr [2 ] tells which word to
return as response -w?, 1-w?+4
input i__spu__w?__rd rd req
input i__spu__w?__wr wr req
input i__spu__valid valid req indication
output o__spu__ack xcache ack
SPU__wj, j+4 response interface X4
output [63:0 ]o__spu__w?__data read response data
output [12:0 ]o__spu__w?__dst destination register identifier
output o__spu__w?__wen response strobe
General interface
input clk__125 125 Mhz clock
input clk__250 250 Mhz clock
input reset__b
output o__sync changes polarity every 125 cycle.when high line .ll and
miss reqeuset are valid
```

One particular implementation of a cache that is illustrated in FIG. 5 is addressed using a structure 600 illustrated in FIG. 6. In the example illustrated in FIG. 6, a first attempt to find a cache line is made using tables 607, and thereafter a second attempt is made using XCAM 601. XCAM 601 includes a number of fields of the type described above, such as the main memory addresses of data being cached and the corresponding indexes that identify the entries in the cache, one or more dirty bit(s) to indicate that there is a change that needs to be written back to memory, and an in-progress bit to indicate that the data is being loaded from main memory. Structure 600 includes a second logic 604 that sets the in-progress bit.

Structure 600 also includes an array of engagement counters 602 that are checked for being zero by a freelist logic 605 to find a candidate for replacement. Logic 605 identifies the least recently used candidate for replacement, if multiple candidates have zero valued engagement counters, and for this reason logic 605 maintains one bit for each engagement counter to indicate aging.

Structure 600 also includes a copyback address array 603 that indicates the addresses of data being written back to main memory. A dirty logic 606 may be used to copy back the data to main memory, although in some embodiments only a portion of the data is written back, and the portion is identified by a set of bits (e.g. 4 bits) that identify this portion as being dirtied from among a number of portions in the cache line.

Structure 600 also includes a con__miss logic 608 that speeds up the handling of consecutive misses, whereas miss Fifo 609 handles a miss normally. For example, if the same address is accessed consecutively, then logic 608 makes it appear as if the data is already present in the CAM although the data may still be in the process of being loaded into the CAM. Logic 608 makes a quick local copy of the data being loaded and uses the local copy to respond to the consecutive miss, thereby to avoid going through the CAM that is still being loaded.

The interfaces for the block illustrated in FIG. 6 are as follows.

```
                        XCAM-XMAU interface input [5:0] i__xmau__cs xcam chip select
0 - normal; 1 - db wr; 2 - db rd; 3-ci operation; 4 - flush; 5 - crc
input [7:0] i__xmau__tn Task number
input [24:0] i__xmau__addr Requesterd address
input [63:0] i__xmau__data XMAU data - Used in debug, CI and flush
operations.
input [12:0] i__xmau__dst Fetch data destination
input [ 7:0] i__xmau__prev__entry Previous entry of request task
input i__xmau__prev__entry__vld valid bit
input i__xmau__wr "1" for write, "0" for read - used in CI operations.
input i__xmau__be__crc byte enable for crc
input [3:0] i__xmau__dwen double word enable - (each bit is per 128 bits
of the line]
input i__xmau__first__access
output [7:0] o__xmau__tn Task Num to XMAU
output [7:0] o__xmau__entry Entry of new address
output o__xmau__strobe xmau data strobe
input i__xmau__spu__w0__wr SFU write to word 0 or 4
input [7:0] i__xmau__spu__wr0__entry SPU entry number
input i__xmau__spu__wr0__addr__2 SPU Address bit 2
input i __xmau__spu__w1__wr SPU write to word 1 or 5
input [7:0] i__xmau__spu__wr1__entry SPU entry number
input i__xmau__spu__wr1__addr__2 SPU Address bit 2
input i __xmau__spu__w2__wr SPU write to word 2 or 6
input [7:0] i__xmau__spu__wr2__entry SPU entry number
input i__xmau__spu__wr2__addr__2 SFU Address bit 2
input i__xmau__spu__w3__wr SPU write to word 3 of 7
input [7:0] i__xmau__spu__wr3__entry SPU entry number
input i__xmau__spu__wr3__addr__2 SFU Address bit 2
input i__xmau__unseq__w0__wr Unseq write to word 0 or 4
input [7:0] i__xmau__unseq__wr0__entry Unseq entry number
input i __xmau__unseq__wr0__addr__2 Unseq Address bit 2
input i__xmau__unseq__w1__wr Unseq write to word 1 or 5
input [7:0] i__xmau__unseq__wr1__entry Unseq entry number
input i__xmau__unseq__wr1__addr__2 Unseq Address bit 2
input i__xmau__unseq__w2__wr Unseq write to word 2 or 6
input [7:0] i__xmau__unseq__wr2__entry Unseq entry number
input i__xmau__unseq__wr2__addr__2 Unseq Address bit 2
input i__xmau__unseq__w3__wr Unseq write to word 3 of 7
input [7:0] i__xmau__unseq__wr3__entry Unseq entry number
input i__xmau__unseq__wr3__addr__2 Unseq Address bit 2

XCAM-MissFifo interface output [63:0] o__miss__data data (CI, Debug)
output [24:0] o__miss__cb__addr address for copyback
output [3:0] o__miss__cb__dirty bit[0] - data[127:0]; bit[1]-
data[255:128];
bit[2] - data[383:256]; bit[3] - data[511:384]
Copy Back will not be in case the dirty bit is '0'.
output [24:0] o__miss__addr fetched line address
```

-continued

```
output [ 7:0] o_miss_entry entry for fetched data
output [12:0] o_miss_dst destination for read response
output [2:0] o_miss_type There could be 6 types of accesses:
1. Miss- Instruct the cache to bring the line back.
2. SecondMiss- Instruct the cache to return the request for a retry
3. CI_Read
4. CI_Write
5. Hit
6. Flush
7. Hit_CRC
8. CI_CRC
9. NOP
output o_miss_strobe Miss fifo storbe
output o_miss_be_crc Byte enable for crc
output [3:0] o_miss_dwen double word enablevb, for partly line fetch.
(each bit is for 128 bits of the line)
```

| XCAM-LineFill interface |
|---|
| input [7:0] i_lf_entry entry |
| input i_lf_strobe write enable bit |
| input [3:0] i_lf_wden double word enable |

| XCAM general interface |
|---|
| input clk_125 system clock |
| input srst_L reset |
| input test_se |
| input test_en |
| input [1:0] test_h |
| output tst_done |
| output [1:0]fail_h |

Numerous modifications and adaptations of the embodiments, examples and implementations described herein will be apparent to the skilled artisan in view of the disclosure. In particular, the invention is not limited by the number of ports, or by any timing, signals, commands or instructions. Depending on the embodiment, a multi-level addressing mechanism of the type described herein can be used with a memory at any level or even with main memory.

Although in certain embodiments, there is only one entry in table 211 (FIG. 2A), and that entry is found by using of an identifier of the task, in other embodiments there are multiple such entries for each task. Specifically, in one example there are four such entries for each task, and each task has four pointers. In one particular implementation of this specific example, table 211 is indexed by a number that is larger than the task identifier by two bits (which identify the four pointers). Such an expanded number may be obtained by concatenating the two bits that identify the pointer either on the left or on the right of the task identifier. In another such example, the entry from table 211 identifies a group of cache line entries, and one of these entries is picked, e.g. by using the just-described two bits in another table. In yet another such example, instead of using another table, addresses in the four cache line entries are compared in parallel with the address of the data being sought. In this manner, the number of guaranteed cache line entries that are provided for each task can be increased to any number depending on the needs of the application.

Numerous such examples, embodiments, implementations and variations are within the scope of the appended claims.

What is claimed is:

1. A method of retrieving data from a cache, the method comprising:

performing a table lookup to retrieve a tag;

comparing the tag with a portion of an address of data being sought; in case of a match in the table, retrieving data from the cache, using an entry number of a cache line identified by the table as an index into the cache;

in case of no match in the table, searching a content addressable memory (CAM) using the portion of the address of the data being sought, and in case of a match in the CAM retrieving said data from said cache, using the entry number of the cache line identified by the CAM as the index into the cache; and in case of no match in the CAM, retrieving said data from a next level memory.

2. The method of claim 1 wherein:

the table lookup is performed using a task identifier.

3. A method of retrieving data from a memory, the method comprising:

performing a table lookup to retrieve a tag;

comparing the tag with a portion of an address of data being sought; and in case of a match in the table, retrieving data from the memory using an entry number of a cache line identified by the table;

in case of no match in the table, searching a content addressable memory (CAM) using the portion of the address of the data being sought, and retrieving said data from said memory using an entry number identified by the CAM;

wherein the table lookup is performed using a number obtained by concatenation of a task identifier and an identity of a pointer.

4. The method of claim 3 wherein:

the table is implemented in random access memory (RAM).

5. The method of claim 3 wherein:

the memory is a cache; and the entry number is used directly as an index into the cache, during retrieval of said data.

6. The method of claim 3 wherein:

the task identifier identifies a task that supplied the address.

7. The method of claim 6 wherein:

the task is one of a plurality of tasks in a network processor.

8. The method of claim 6 wherein:

the task processes a packet or cell of traffic in a network.

9. A system for retrieving data from a cache, the system comprising:

a first addressing structure couplable to a processor to receive an identity of a task and a tag, and couplable to the cache to provide thereto an entry number of a cache line; and a second addressing structure, implemented in a content addressable memory (CAM) and coupled to the first addressing structure to update information therein, and couplable to said cache to provide thereto said entry number wherein the entry number is used directly as an index into the cache, during retrieval of said data.

10. The system of claim 9 wherein:

the first addressing structure is implemented in random access memory (RAM).

11. The system of claim 9 wherein:

the first addressing structure comprises means for performing a table lookup.

12. A method of retrieving data from a cache, the method comprising:

performing a table lookup to identify a group of tags;

comparing at least one of the tags with a portion of an address of data being sought; and in case of a match, retrieving data from the cache using an entry number of a cache line identified by the table as an index into the cache;

in case of no match, searching a content addressable memory (CAM) using the portion of the address of the data being sought, and retrieving said data from said memory using an entry number identified by the CAM as an index into the cache.

13. The method of claim 12 further comprising:

comparing each of the tags with the portion of address of the data being sought.

14. The method of claim 1 further comprising:

performing another table lookup to identify said one of the tags.

* * * * *